(12) United States Patent
Jaroch (10) Patent No.: US 10,992,467 B2
(45) Date of Patent: Apr. 27, 2021

(54) SYSTEM AND METHOD FOR ENCRYPTING INFORMATION WITH POLYNOMIAL DISTRIBUTED STRINGS

(71) Applicant: Colossio, Inc., Chicago, IL (US)

(72) Inventor: Joseph A. Jaroch, Chicago, IL (US)

(73) Assignee: Colossio, Inc., Chicago, IL (US)

( * ) Notice: Subject to any disclaimer, the term of this patent is extended or adjusted under 35 U.S.C. 154(b) by 294 days.

(21) Appl. No.: 15/923,897

(22) Filed: Mar. 16, 2018

(65) Prior Publication Data

US 2019/0288838 A1   Sep. 19, 2019

(51) Int. Cl.
*H04L 9/08* (2006.01)
*H04L 9/30* (2006.01)

(52) U.S. Cl.
CPC .......... *H04L 9/0869* (2013.01); *H04L 9/3026* (2013.01); *H04L 9/3033* (2013.01)

(58) Field of Classification Search
CPC ... H04L 9/0869; H04L 9/3033; H04L 9/3026; H04L 9/08; H04L 9/30
See application file for complete search history.

(56) References Cited

U.S. PATENT DOCUMENTS

| | | | | |
|---|---|---|---|---|
| 2008/0019511 A1* | 1/2008 | Akiyama | ................ | G06F 7/724 380/30 |
| 2017/0373834 A1* | 12/2017 | Mandal | ................. | H04L 9/0869 |
| 2018/0239910 A1* | 8/2018 | Isshiki | .................... | G06F 21/32 |
| 2018/0241548 A1* | 8/2018 | Dolev | .................. | H04L 9/0656 |
| 2019/0036678 A1* | 1/2019 | Ahmed | ................... | H04L 9/302 |
| 2020/0136797 A1* | 4/2020 | Yu | .......................... | H04L 9/008 |

* cited by examiner

*Primary Examiner* — Lynn D Feild
*Assistant Examiner* — Vladimir I Gavrilenko
(74) *Attorney, Agent, or Firm* — Barnes & Thornburg LLP (57) ABSTRACT

An encryption system is provided. The system includes a plurality of communication devices, one or more processors, one or more memory components, one or more network connections, and a data repository. The data repository is stored by the plurality of communication devices on the one or more memory components thereof. A polynomial function is developed to point to message data within the data repository, wherein the polynomial function is transmitted between the plurality of communication devices to exchange the message data.

12 Claims, 5 Drawing Sheets

...[1000 random characters]aaaaaTaaTxxxxExxxxxxxxxxxxxxSxxxxxxxxxxxxxxxxxxxxxxxxxxxxTaaaa...

SYSTEM AND METHOD FOR ENCRYPTING INFORMATION WITH POLYNOMIAL DISTRIBUTED STRINGS

TECHNICAL FIELD

The present disclosure generally relates to computer security, and more specifically, relates to a system and method for encrypting information with polynomial distributed strings.

BACKGROUND

The modern world increasingly depends on computing. Therefore, computing security continues to increase in importance. Encryption is a foundational aspect of computing security. Often times, encryption is implemented through the mathematical principals inherent in the difficulty of factoring large prime numbers. The multiplication of prime numbers is a computationally efficient and fast operation. By comparison, extracting the unique pair of prime numbers comprising a number requires a relatively large computational effort. Furthermore, given the state of the art, a truly efficient solution is not currently available with conventional computing methods.

Conventional encryption uses the relatively large computational costs for factoring large prime numbers as an advantage. Many prior art encryption techniques are constructed, in part, on operations with pairs of prime numbers acting as both a public and private key, thereby allowing data to be encrypted for transmission. When the key is a large prime number, uncovering the key by a brute-force decryption method would have an impractically long runtime, perhaps billions of years.

However, inefficiency associated with computing prime pairs arises from the nature of conventional, linear computing methods. Recent advances in the art related to quantum computing may offer alternative solutions to address this inefficiency. In conventional computing, information is stored according to a binary methodology, i.e. as "ones" and "zeroes." However, according to a quantum computing methods data is stored as a continuous superposition of quantum states. As the state of the art related to quantum computing becomes more robust, the integrity of conventional security/encryption techniques may be undermined.

For example, Shor's algorithm is a quantum algorithm for integer factorization. Shor's algorithm runs in polynomial time, i.e., for a problem of size n, the time or number of steps needed to find the solution is a polynomial function of n. On a relatively small-scale, Shor's algorithm has been implemented with quantum computers operating on quantum bits (qubits). Other quantum algorithms such as GEECM, which uses quantum computing techniques to perform elliptic-curve factorization, also indicate possible efficiency gains in integer factorization. Development of these and other quantum algorithms at least foreshadows that it is possible for integers to be factorized and, therefore, for conventional encryption techniques to be broken. As will be apparent to the reader, breaking of conventional encryption represents a serious threat to modern computing and, likewise, threatens the foundations of modern social, economic, and industrial structures.

Therefore, a security method and/or system that is an alternative to conventional prime number based encryption represents an advancement in the art. The present disclosure describes an atypical method of data encryption that forecloses any possibility of qubits being used for decryption. In fact, it is impractical, if not impossible, for quantum or classical computers to break the encryption of the method and/or system detailed hereinbelow.

The description provided in the background section should not be assumed to be prior art merely because it is mentioned in or associated with the background section. The background section may include information that describes one or more aspects of the subject technology.

SUMMARY

According to certain aspects of the present disclosure, the subject technology relates to an encryption system. In one embodiment, the encryption system, comprises: selecting a seed for a pseudorandom number generator; transmitting the seed to one or more devices; populating a data repository based on outputs of the pseudorandom number generator in response to the seed; encrypting a message, comprising: generating a plurality of random numbers; indicating a starting position with a first random number of the outputs of the pseudorandom number generator; expanding a polynomial expression with remaining random numbers of the outputs of the pseudorandom number generator; and, searching the data repository according to the starting position, the polynomial expression, and a message length until all characters of the message are identified within the data repository; transmitting the starting position, the polynomial expression, and the message length to the one or more devices; and, decrypting the message by searching the data repository according to the starting position, the polynomial expression, and the message length.

The disclosure subject technology further relates to wherein the one or more devices include at least one transmitting device and at least one receiving device; and further comprising the step of connecting the at least one transmitting device with the at least one receiving device over a network.

The disclosure subject technology further relates to further comprising: concatenating the starting position, the polynomial expression, and the message length into a transmission; and encrypting the transmission.

The disclosure subject technology further relates to wherein the network is an internet connection; and wherein the transmission is encrypted before being transmitted over the internet.

The disclosure subject technology further relates to an encryption system, comprising: a transmitting device; at least one receiving device; wherein each device comprises at least one processor and at least one memory component; at least one network operatively connecting the transmitting device and the at least one receiving device; and, identical instances of a data repository stored on the at least one memory component of each of the devices; wherein the transmitting device searches for characters of the message data within the data repository; wherein the transmitting device produces a starting offset position, a polynomial expression, and a message data length that together define the location of the message data within the data repository; wherein the transmitting device transmits the starting offset position, the polynomial expression, and the message data length to the receiving device; and, wherein the receiving device decrypts the message data by searching for the message data within the data repository according to a function of the starting offset position, the polynomial expression, and the message data length.

The disclosure subject technology further relates to further comprising: at least one pseudorandom number generator that produces a sequence of random numbers; and wherein the sequence of random numbers defines the starting offset position, the polynomial expression, and the message data length.

The disclosure subject technology further relates to wherein the pseudorandom number generator is initialized by a seed packet determined by the transmitting device.

The disclosure subject technology further relates to wherein the pseudorandom number generator produces the identical instances of the data repository stored on the at least one memory component of each of the devices.

The disclosure subject technology further relates to wherein the starting offset position, the polynomial expression, and the message data length, are concatenated by the transmitting device to produce a transmission.

The disclosure subject technology further relates to wherein the transmission is encrypted before the transmitting device transmits the transmission to the receiving device.

The disclosure subject technology further relates to wherein authorization to access the message data for the at least one receiving device is revoked by deleting the instance of the data repository stored on the at least one memory component of the at least one receiving device.

The disclosure subject technology further relates to wherein the message data length is divided if a first instance of the polynomial expression does not locate the message data within the data repository at all possibilities of the starting offset position.

The disclosure subject technology further relates to an encryption system, comprising: a plurality of communication devices; one or more processors; one or more memory components; one or more network connections; a data repository; wherein the data repository is stored by the plurality of communication devices on the one or more memory components thereof; and, a polynomial function developed to point to message data within the data repository; wherein the polynomial function is transmitted between the plurality of communication devices to exchange the message data.

The disclosure subject technology further relates to further comprising one or more instances of a pseudorandom number generator stored one the one or more memory components.

The disclosure subject technology further relates to further comprising a seed packet distributed to the plurality of communication devices wherein the one or more instances of the pseudorandom number generator are initialized by the seed packet.

The disclosure subject technology further relates to wherein the pseudorandom number generator generates a plurality of random numbers for encrypting the message data.

The disclosure subject technology further relates to further comprising a transmission comprising a starting offset position, a length value of the message data, and the polynomial expression.

The disclosure subject technology further relates to wherein the plurality of communication devices further comprises at least a transmitting device and a receiving device.

The disclosure subject technology further relates to wherein the transmitting device transmits the transmission to the receiving device without transmitting the message data.

The disclosure subject technology further relates to wherein the receiving device locates the message data within the data repository according to the starting offset position, the length value of the message data, and the polynomial expression of the transmission.

Other aspects and advantages of the present disclosure will become apparent upon consideration of the following detailed description and the attached drawings wherein like numerals designate like structures throughout the specification.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Still further, modules and processes depicted may be combined, in whole or in part, and/or divided, into one or more different parts, as applicable to fit particular implementations without departing from the scope of the present disclosure. Accordingly, the drawings and description are to be regarded as illustrative in nature and not restrictive.

General Overview

Figure 1:
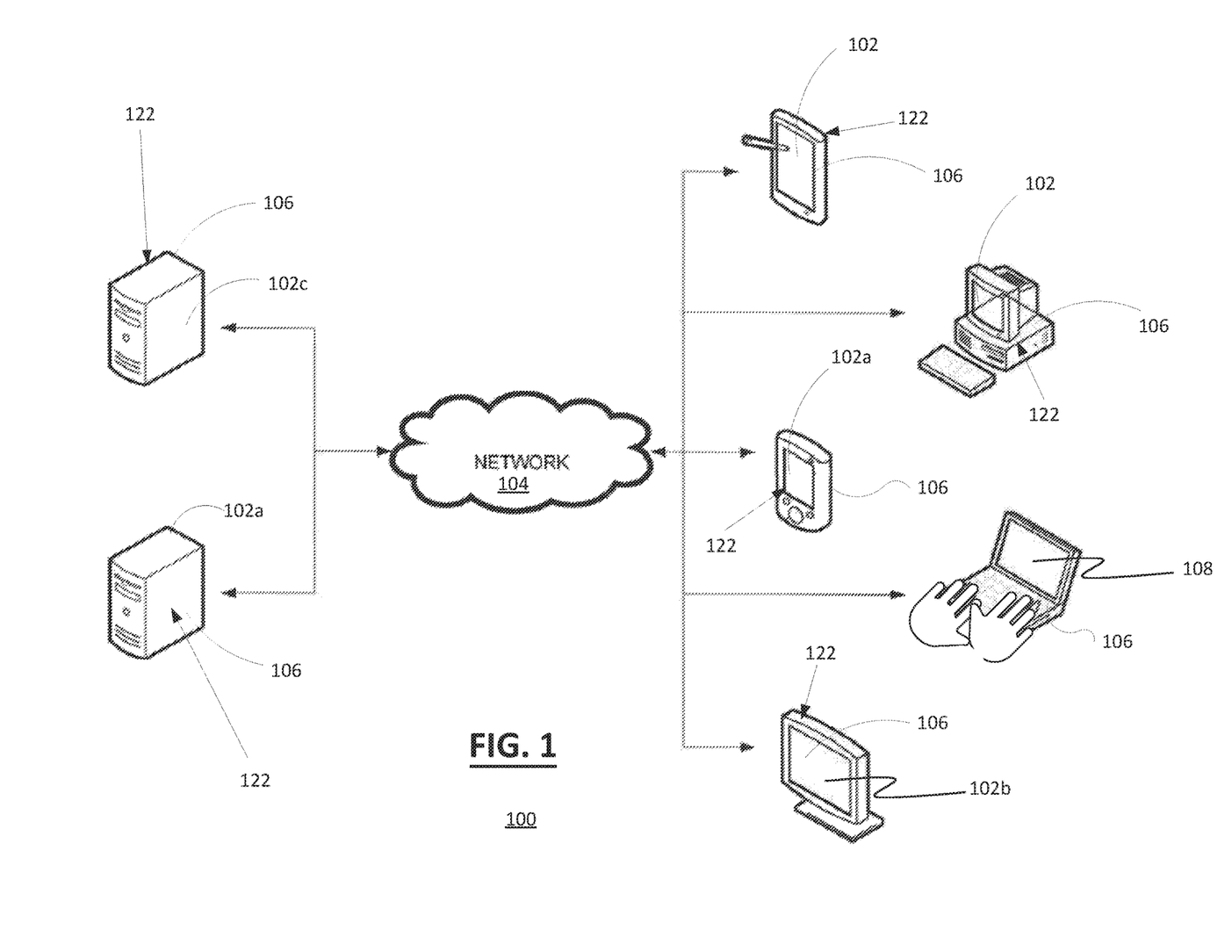
FIG. 1 illustrates an example communications system that uses the encryption system/method and performs example processes thereof in accordance with the present disclosure.
Figure 2:
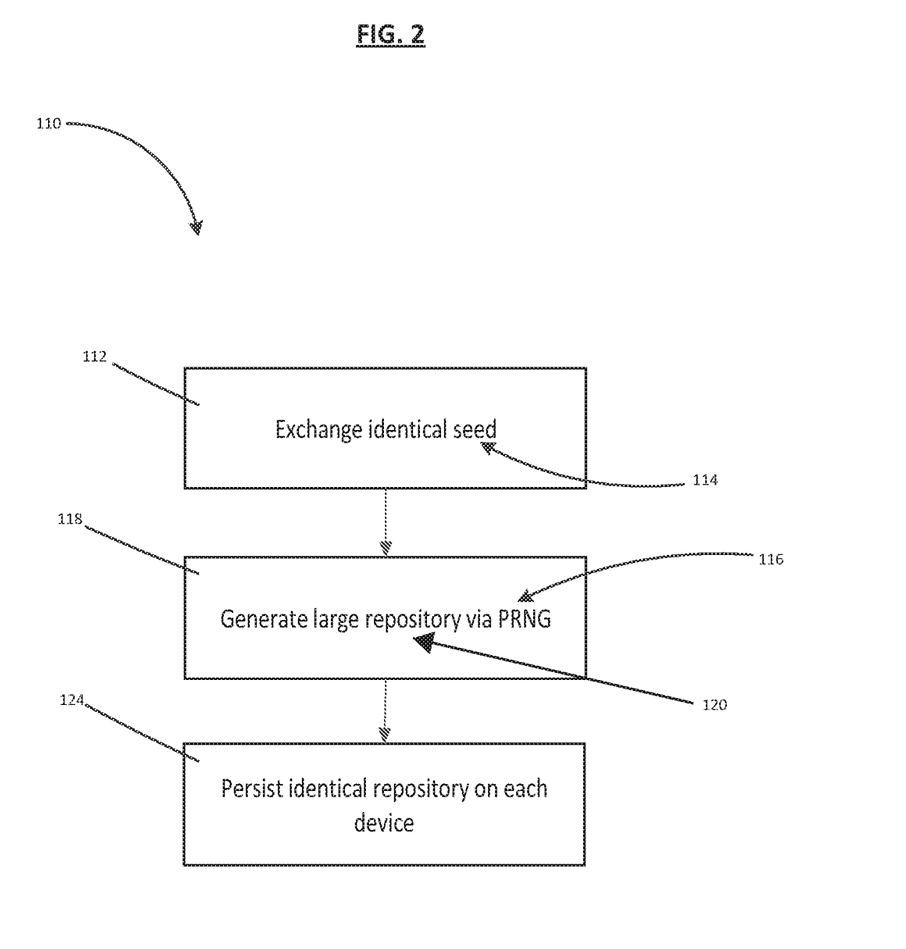
FIG. 2 illustrates an example pairing routine that produces a data repository for use by the encryption system.
Figure 3:
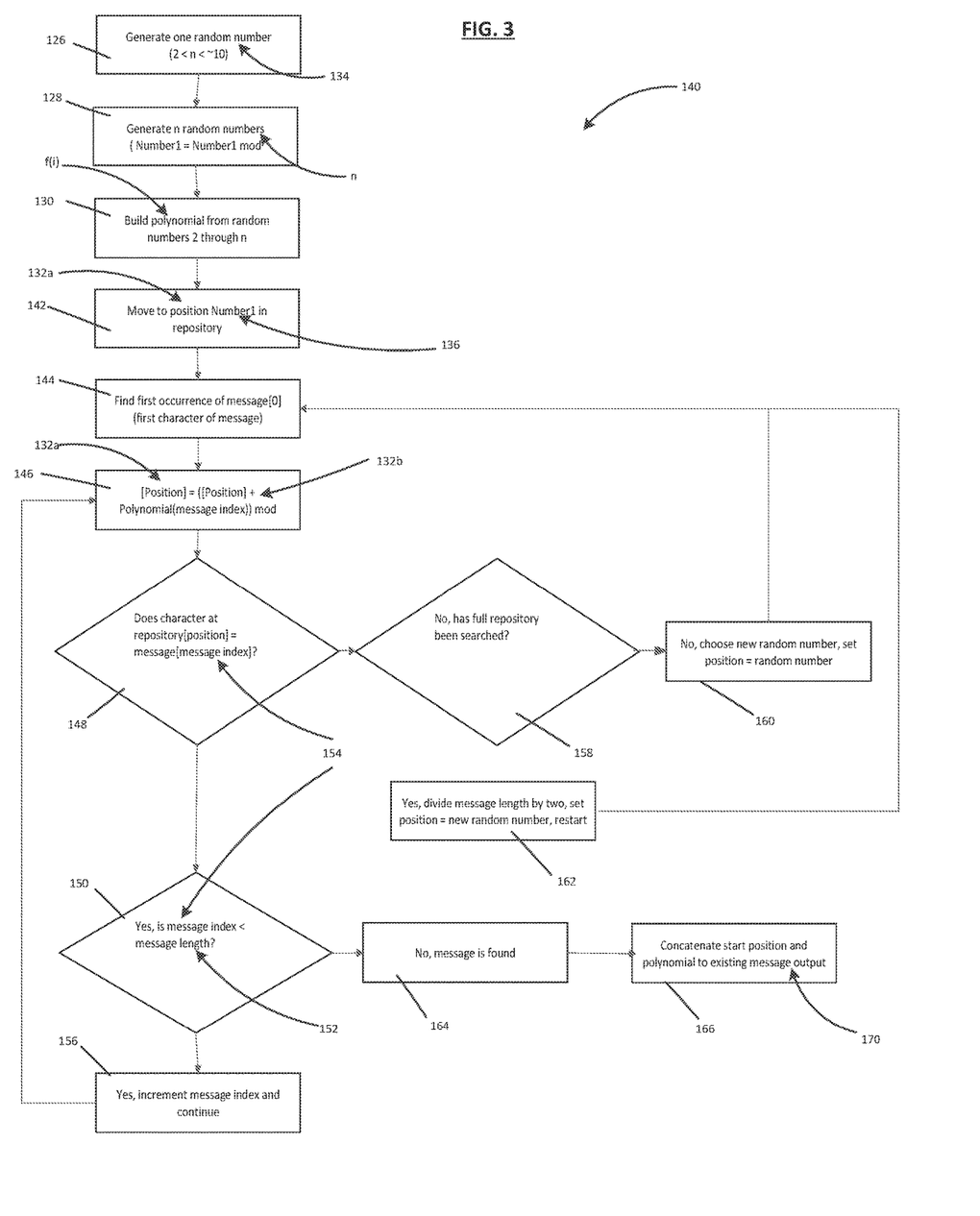
FIG. 3 is a flowchart depicting an example transmission generation or encrypting process for generating an output transmission that indicates the location(s) of a desired message within the data repository produced by the process of FIG. 2 during operation of the encryption system.
Figure 4:
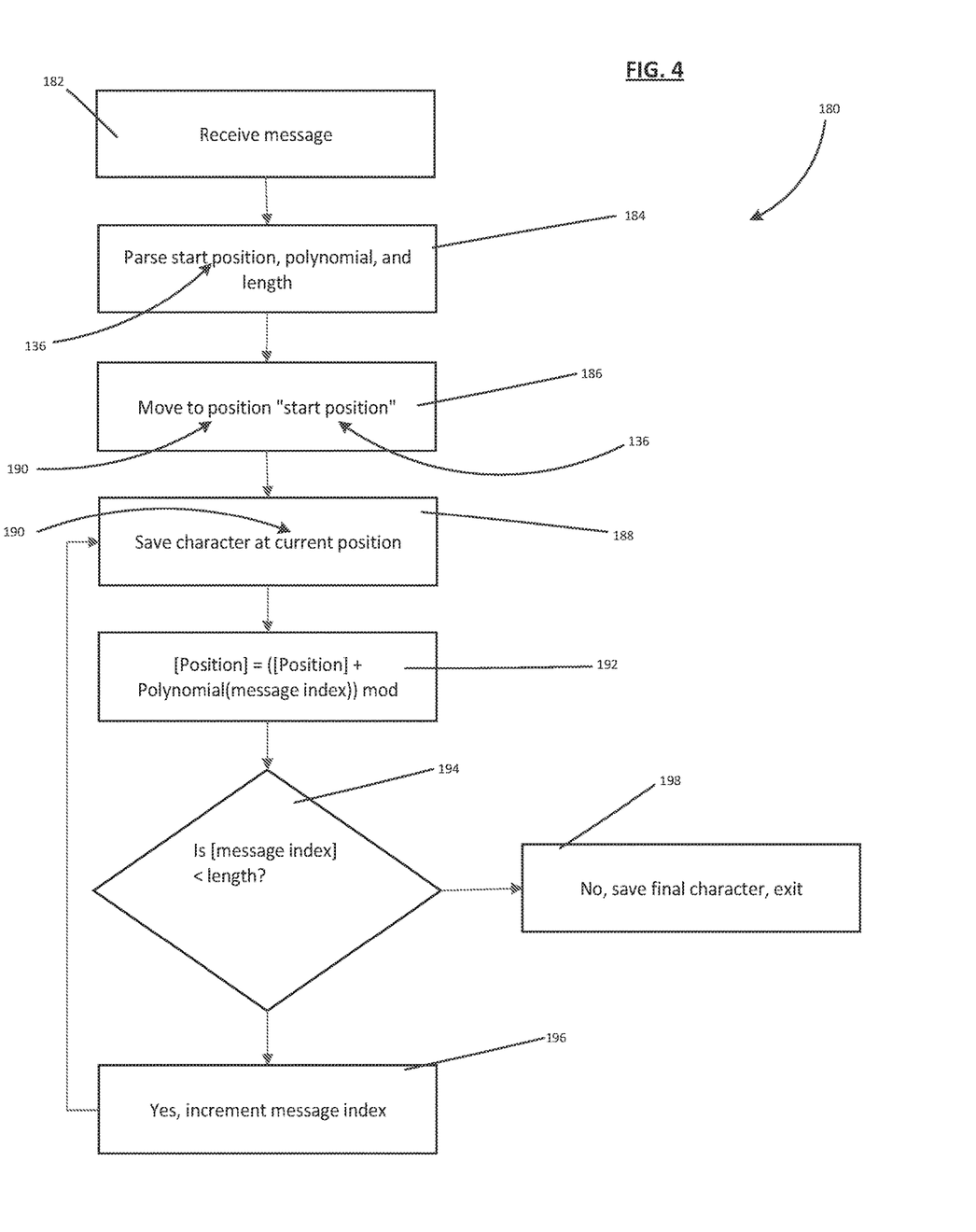
FIG. 4 is a flowchart depicting an example decrypting process for decrypting the output transmission generated by the example transmission generation process of FIG. 3 during operation of the encryption system.

In an example embodiment, a disclosed encryption system and method 100, the processes thereof being illustrated by FIGS. 2-4, facilitates secure communication amongst a plurality of communication devices 102, illustrated in FIG. 1. The plurality of communication devices 102 may be connected by one or more networks 104, and each device contains one or more processors 122 suitable for carrying out the processes illustrated in FIGS. 2-4. As noted hereinabove, security is often an important consideration for computing devices, and, in particular, for computing devices that communicate with one another over a network and/or the internet. One method of securing devices and the communications therebetween is encryption. The encryption system and method 100 is an atypical method/system of data encryption that is impractical for quantum or classical computers to break.

The disclosed encryption system and method 100 addresses a technical problem tied to computer technology and arising in the realm of computer networks, namely the technical problem of securely encrypting communications and transmitting same amongst two or more of the trusted devices 102 by referring, by way of a polynomial $f(i)$, to a large data repository 120 (see FIG. 2) persisting within each trusted device 102. The disclosed system solves this technical problem by generating the identical data repositories 120 (on one or more trusted devices 102) for use in the encryption method/system 100. Then the disclosed system 100 operates upon message data 138 (see FIG. 3) to locate the message data 138 within the data repository 120 and develop a polynomial $f(i)$ identifying the locations of characters in said message data 138 within the data repository 120.

According to the disclosed encryption system/method 100, a first, transmitting device 102a transmits the polynomial $f(i)$ to another of the trusted devices 102b. When the polynomial $f(i)$ is received by the second, receiving device 102b, the polynomial $f(i)$ directs the receiving device 102b to the locations of the message data 138 within the identical data repository 120 persisting on a memory 106 of the receiving device 102b. The disclosed encryption system and method 100 provides a solution necessarily rooted in computer technology because the solution has been prompted by developments in computing technology; specifically, advancements in computing prime pairs, which compromise the security of conventional encryption techniques. The disclosed encryption system and method 100 is also rooted in the computing environment because recent advancements in storage capabilities and improvements in memory availability enable the presently described solution. The large data repositories 120 contemplated herein have significant memory needs that would have been too cumbersome for devices prevalent in the recent past.

The presently disclosed system and method 100 may be implemented on two devices, with one of the devices initiating the encryption by generating a seed packet 114 (referring ahead to FIG. 2). In another example embodiment, the encryption method and system 100 may be used with any number of devices managed by a central hub device 102c (again, see FIG. 2), such as a server, which generates the seed packet 114 and distributes same to the trusted devices 102. Also according to example embodiments, the seed packet 114 may be generated by the first device 102a, transmitted to the second device 102b, and then relayed from the second device 102b to a next trusted device 102c. The encryption system and method is contemplated as operable between two paired devices, a centrally managed network of devices, and/or a daisy chain of devices.

Example System Implementation

Referring now to FIG. 2, to implement the encryption system/method 100, the at least two devices 102 are paired by a device pairing routine 110. At a first step 112, a seed 114 is transmitted between the at least two devices 102. In an example embodiment, the seed 114 takes the form of an identical packet exchanged between the devices, e.g., the first, transmitting device 102a transmits the seed packet 114 to the second, receiving device 102b and/or a third device, such as the master/controlling device 102c, transmits the seed packet 114 to the other of the at least two devices 102. The generation and transmission of the seed packet 114 may be performed in accordance with methods and systems described in U.S. patent application Ser. No. 15/722,663, entitled "One Time Pad Encryption" or through conventional mechanisms. Each of the at least two devices 102 uses the seed packet 114 to seed a pseudorandom number generator (PRNG) 116. PRNGs are algorithms for generating a sequence of numbers whose properties approximate the properties of sequences of random numbers. A number sequence generated by a particular PRNG is not truly random, because the number sequence is determined by an initial value, i.e., the seed. According to the encryption system/method 100, the at least two devices 102 both have access to the same PRNG 116, albeit different instances thereof loaded onto the at least two devices 102, and an identical seed packet 114. The seed packet 114 provides the initial value for the PRNG 116. The PRNG 116 may be a commonly distributed conventional PRNG that many devices have in common and/or the PRNG 116 may be the random number generator described in U.S. patent application Ser. No. 15/689,118, entitled "Cryptographically Secure Random Number Generator". The period of the PRNG must be larger than the desired length of the repository.

In example embodiments, the data repository 120 (see FIG. 2) may be several hundred megabytes or larger. In further example embodiments, aimed at achieving maximally secure communications, the data repository 120 may be several terabytes in size. As is detailed further hereinbelow, the data repository 120 allows communications between the devices 102 to be encrypted and decrypted. If an unauthorized device 108 (see FIG. 1) seeks to obtain communications encrypted according to the encryption system/method 100, said unauthorized device 108 may endeavor to copy or gain access to the data repository 120. In example embodiments, the data repository 120 having a relatively larger size may increase security because, if the unauthorized device 108 attempts to copy the data repository 120 or exfiltrate it from the server/device 102, such a transmission is easily identifiable due to the large size thereof. Further, a partial copy of the data repository 120 is not capable of decrypting the encrypted communications. Therefore, when the data repository 120 is large, it is less likely that the entire data repository 120 might be copied without interruption, countermeasure, and/or detection. According to a conventional encryption technique using a data repository, only some portion of such a repository is used as a key to encrypt the data. Consequently, if an unauthorized device captures/accesses the portion of a data repository containing the key, then the conventional encryption is compromised even though the entirety of the subject data repository has not been copied.

At step 118, the PRNG 116, initialized with the seed packet 114, generates the large repository of data 120. As earlier noted, the data repository 120 is generated on each of the devices 102 with identical initial values defined by the seed packet 114; therefore, the data repository 120 on every device is identical to the data repository 120 on every other device of the trusted communication devices 102. In other words, the devices 102 simultaneously develop identical instances of the data repository 120. At step 124, the identical instances of the data repository 120 are persisted in the memories 106 of each of the devices 102 using the encryption system/method 100.

Referring now to FIG. 3, a transmission generation process 140 is illustrated. At steps 126, 128, and 130, the polynomial function ƒ(i) is produced by the transmitting device 102a through the generation of random numbers. In example embodiments, the transmitting device 102a selects at least three random numbers but fewer than ten random numbers.

During the step 126, a relatively large random number 134 is generated. The first, large random number 134 is used as a starting offset position 136. The starting offset position 136 indicates a starting location within the string of characters (see FIG. 5 for an example) comprising the data repository 120. When the large random number 134 exceeds a field size of the data repository 120, the offset is modulus the field size of the data repository 120, i.e., the starting offset position 136 wraps around to the beginning of the data repository 120 as many times as the large random number 134 is divisible by the field size of the data repository 120.

The subsequently generated random numbers n are relatively small, e.g., from one to twenty. According to the encryption system and method 100, the subsequently generated random numbers n are used as coefficients, exponents, and a constant to form the monomials of the polynomial ƒ(i). The number of monomials is determined by the number of subsequently generated random numbers n. For example, if the random numbers n [4, 6, 5, 3] are generated, then these example random numbers n are expanded to form the polynomial ƒ(i): $4x^6+5x+3$ having said random number n populating the first coefficient, first exponent, second coefficient, and constant, from left to right across the polynomial expression ƒ(i).

The contemplated methodology ensures that one constant results. However, when the number of subsequently generated random numbers n is even, the penultimate monomial is left without an exponent. As a further example, if the numerals [4, 6, 5] are generated, the resulting polynomial expression: $4x^6+5$ is generated. By way of yet another example, if the numerals [4, 6, 5, 3, 9] are generated during step 126 and 128, the polynomial: $4x^6+5x^3+9$ results.

Upon generation of the polynomial ƒ(i) and the first, large random number 134, the data repository 120 is searched for the message data 138, i.e., the string of characters to be encrypted. Specifically, the transmitting device 102a searches for the message data 138 beginning at the starting offset position 136. At step 142, the transmission generation process 140 locates the starting offset position 136 in accordance with the details mentioned hereinabove. Then, at next step 144, beginning at the starting offset position 136, the transmission generation process 140 searches for a first character of the message data 138. The polynomial ƒ(i), which has been selected at random, defines how each search is performed following location of the first character of the message data 138. Once the first character of the message data 138 is found, a current position 132a within the data repository 120 is updated to the current position plus the first value of the polynomial function ƒ(i), i.e., current position+ƒ(1). The current position 132a is updated at step 146 to an updated current position 132b.

At decision step 148, the data located at f(1) is compared to a next character of the message data 138. If f(1) matches the next character of the message data 138, then the transmission generation process 140 moves to decision step 150 where a length 152 of the message data 138 is checked against a message index 154 that counts characters of the message data 138. If characters of the message data 138 remain to be found, then step 156 returns the transmission generation process 140 to the step 146 whereby the current position 132a is updated by the value of the polynomial function ƒ(i) for the next message index 154, i.e., current position+f(2). Data located at the updated current position 132b is checked against a next sought character of the message data 138. Each subsequent character of the message data 138 is checked against updated current positions 132b resulting from the value of the polynomial function ƒ(i) at subsequent character indices 154; for example, f(2), f(3), . . . f(n). A complete match is found if each subsequent character of the message data 138 occurs at the current position 132a plus the result of the polynomial evaluated with "x" equal to the character index 154.

The transmission generation process 140 identifies a string of characters sparsely distributed throughout the data repository 120. This searching technique ensures that identical messages differ in content, because the starting offset position 136 is randomly generated. Therefore, the encrypted identical messages are not able to be derived in-stream. For example, given the example polynomial function of $f(x)=3x^2+1$, characters of the message data 138 correlating to message indices 154 1 (second character), 2 (third character), and 3 (fourth character) are expected at the current positon plus f(1)=4, f(2)=13, and f(3)=28. The first character is expected at the starting offset position 136.

Referring once again to the decision step 148, if f(1) does not match the next character of the message data 138, then the transmission generation process 140 moves to decision step 158 where the transmission generation process 140 determines whether or not the every position within the data repository 120 has been checked as the starting offset position 136. If all positions of the data repository 120 have not yet been used as the starting offset position 136, then the large random number 134 is re-generated at step 160 and the transmission generation process 140 returns to the step 144. Alternatively, if, at the decision step 158, all positions of the data repository 120 have been used as the starting offset position 136, then the message data 138 is not found within the data repository 120 according to the polynomial function ƒ(i). If the message data 138 is not present, then, at step 162, the length 152 of the message data 138 is divided in half. Upon division of the message data 138, the transmission generation process 140 returns to the step 144 and begins searching for the message data 138 (now halved in length) with a newly generated instance of the large random number 134 indicating the starting offset position 136.

Again, at the step 150, if the character index 154 of the message data 138 is equal to the message length 152, then the entire message data 138 has been located within the data repository 120. Accordingly, the transmission generation process 140 has succeeded and moves to step 164 to confirm that the entirety of the message data 138 is represented. To complete the transmission generation process 140, at step 166, the starting offset position 136, subsequently generated random numbers n, and message length 152 are concatenated to form a transmission 170 resulting from the transmission generation process 140. The transmission 170 is encoded/encrypted, such as with a conventional encryption technique, and sent from the transmitting device 102a to the receiving device 102b.

Depending on the size of the data repository 120 and the complexity of the messages 138 being sent, some messages may not be found in their entirety. As mentioned hereinabove, to address this problem, messages 138 are reduced in size by half until the components of the message data 138 are each found in their entirety. The transmission generation process 140 is repeated for each substring of the message data 138 with the starting offset position 136 and the subsequently randomly generated numbers n defining the polynomial $f(i)$ undergoing re-randomization for each substring. When the message data 138 is sub-divided, the final transmission is comprised of concatenated starting offset positions 136 for each substring's starting offset, polynomial, and length. Further, when the message data 138 is divided into sub-strings, in one embodiment a new polynomial is generated for each subdivision, with a new random starting position. The message data 138, or sub-strings thereof, may be repeatedly divided until all characters of the message data 138 are found within the data repository 120.

The random numbers n, the starting offset position 136, and the message length 152 supply the receiving device 102b with the information for recreating the message data 138. Therefore, the message data 138 is not transmitted between the devices 102, even in an encrypted format. Instead, the transmission 170 only includes information for recreating the message data 138 with reference to the data repository 120 (or a copy thereof persisted on the receiving device 102b). In this way, an additional layer of security is developed that cannot be circumvented by quantum algorithms because the transmission 170 lacks meaning without reference to a copy of the identically maintained data repository 120.

Rather than transmitting the message data 138 as an encrypted message, which might be decrypted with a brute force technique for uncovering the key thereto, the transmission 170 is a set of pointers to characters within the data repository 120 already residing in the memory 106 of the receiving device 102b. The presently described encryption system and method 100 is deliberately time consuming so as to ensure that the contents of the message data 138 is entirely absent from the transmission 170. Depending on the size of the data repository 120, this process can result in a significantly smaller transmission as compared with a conventionally encrypted transmission because the transmission 170 of the present system/method 100 contains only the starting offset position 136 and polynomial function numbers n to identify the entirety of the message. In contrast, a conventionally encrypted message may include the entire message contents.

Referring now to FIG. 4, a decrypting process 180 is illustrated by a flowchart. The decrypting process 180 begins at step 182 with receipt of the transmission 170 by the receiving device 102b. Upon receipt of the transmission 170, the decrypting process 180 progresses to step 184. At the step 184, the transmission 170 is parsed into the component parts thereof: the random numbers n defining the polynomial $f(i)$, the starting offset position 136, and the message length 152. At step 186, the decrypting process 180 accesses the identical data repository 120 and navigates to a current position 190 within the data repository 120 dictated by the starting offset position 136 parsed out from the transmission 170 at step 184. This current position 190 represents the first character of the message data 138, which is saved at a next step 188.

At step 192, the current position 190 is updated in accordance with the polynomial function $f(i)$ parsed out from the transmission 170 at the earlier step 184. The next character found at an updated current position within the data repository 120 at the step 192 corresponds to the character at the second message index 154 of the encrypted message data 138. This character is stored as the decrypting process 180 moves on to decision step 194. At the decision step 194, the current message index 154 is compared to the message length 152, which was also parsed out of the transmission 170 during the step 184. If the current message index 154 is still less than the message length 154, then the message data 138 has not been fully retrieved and the decrypting process 180 is not yet complete. Therefore, the decrypting process 180 moves to step 196 whereat the message index 152 is incremented and the decrypting process 180 is returned to the step 188 to continue retrieving characters from the data repository 120.

However, if, at the decision step 194, the message index 152 equals the message length 154 received with the transmission 170, then the decrypting process 180 progresses to step 198 and saves the immediately retrieved and final character of the message data 138. At step 198, the message data 138 has been entirely retrieved from the data repository 120 and so the decrypting process 180 is complete.

Figure 5:
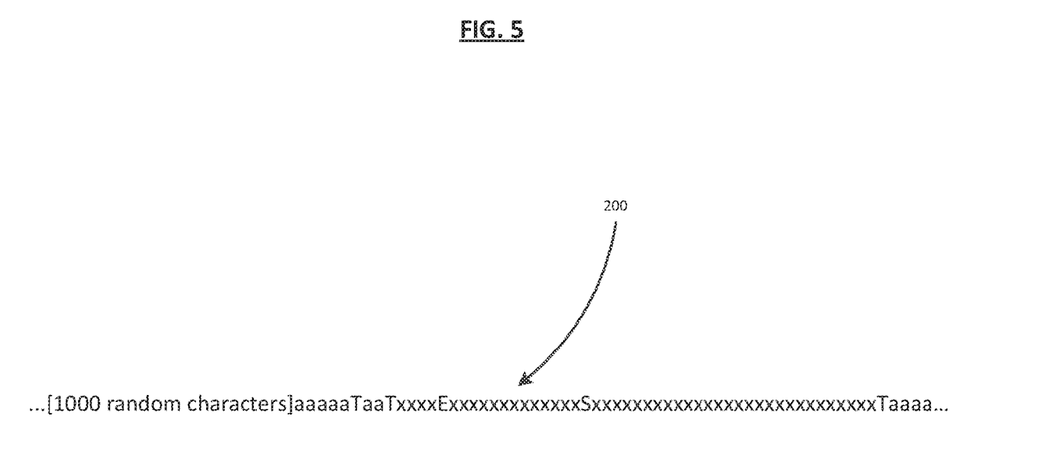
FIG. 5 illustrates an example string of characters within an example instance of the data repository.

In an example implementation, the data repository 120 includes the example string of characters 200 depicted in FIG. 5. According to this example, the "x" and "a" characters are placeholders for characters randomly generated by the PRNG 116. To encrypt the example message "TEST" with the polynomial function $f(i)=[3x^2+1]$, the encryption system/method 100 begins at the randomly chosen starting offset position 136, indicated in FIG. 5 as the start of the example string 200.

First, the transmission generation process 140 searches for the first occurrence of the first character of the message data 138 beginning at the randomly chosen starting offset position 136. Here the offset starting position 136 is 1000 characters into the data repository 120. The transmission generation process 140 finds the first "T" of "TEST" at current position 132a: 1006. Once the first "T" is found, the transmission generation process 140 checks the next location in the data repository 120 by moving forward by four characters (because f(1)=4). The transmission generation process 140 evaluates the character located at the updated current position 132b for a match to the second letter in the message data 138: "E". In the example of FIG. 5, the next character of the message data 138: "E" does not match the updated current position 132b, so the transmission generation process 140 continues traversing the data repository 120.

After moving forward past the two further "a" place holders, the transmission generation process locates a second "T", which again matches the first character of the message data 140. Once again, the transmission generation process 140 proceeds from the current position 132a forward four characters (because f(1)=4 in the present example). The transmission generation process 140 finds an "E" character located at the updated current position 132b. Consequently, the transmission generation process 140 again updates the current position 132a by thirteen characters (because f(2)=13 in the present example). This new updated current position 132b returns character "S". Therefore, the transmission generation process 140 again updates the current position 132a by another twenty-eight positions (because f(3)=28). At this next updated position 132b, the transmission generation process 140 identifies the last character of the message data 138: "T".

Thusly, the transmission generation process 140 is successful in developing the transmission 170 that points to the message data 138 within the data repository 120. As described hereinabove, the valid instance of the message data 138 located within the data repository 120 can now be transmitted from the transmitting device 102a to the receiving device 102b. Still further, and again as previously noted herein, the transmission 170 is a concatenation of the starting offset position 136, the randomly generated numbers n, and the message length 152. The transmission 170 allows the receiving device 102b to locate the characters of the message data 138 within the identical data repository 120 stored on the receiving device 102b.

In the presently discussed example of FIG. 5, the transmission 140 would read: 1009:3*2*1:4, with 1009 representing the starting offset position 136 of the first character in the message data 138: "T". The randomly generated numbers n: "3*2*1" expand to the polynomial function $f(i)=3x^2$. In this example transmission, asterisks are placed between each randomly generated number n to serve as delimiters. Another suitable delimiting character, such as a comma may be used in place of the asterisks. A further portion of the transmission 170 represents the length 152 of the message data 138. Here, the length of "TEST" is "4" because the message data 138 contains four characters. As noted previously, the final transmission 170 (e.g., 1009:3*2*1:4) may be encrypted using another conventional encryption algorithm to further obfuscate the contents thereof. For this purpose, any number of readily available conventional, off-the-shelf encryption techniques are complementary to the presently disclosed encryption system and method 100.

Example System Architecture

Architecturally, the representative technology can be deployed anywhere. For example, it may be preferable to operate between one or more devices or across a network of devices controlled by a server. The devices using the encryption method and system 100 preferably have memory suitable for storing local copies of the data repository and processing power suitable for searching the data repository.

Example embodiments of the disclosed system 100 are described hereinthroughout with reference to FIGS. 1-4 which illustrate the encryption system/method 100 and the processes 110, 140, 180, thereof, which, taken together, illustrate the subject of this disclosure. While the example processes 110, 140, 180 of FIGS. 2-4 are described with reference to FIG. 1, it should be noted that steps of the processes 110, 140, 180 may be performed by other systems including systems having more or fewer parts relative to the system 100 of FIG. 1. In certain aspects, the system 100 may be implemented using hardware or a combination of software and hardware, either in a dedicated server or integrated into another entity or distributed across multiple entities. The system 100 may include illustrative primary architectural/hardware components including the trusted devices 102 and the one or more networks 104. The user device(s) 102 may be, for example, desktop computers, mobile computers, tablet computers (e.g., including e-book readers), mobile devices (e.g., a smartphone or personal digital assistant), set top boxes (e.g., for a television), video game consoles, or any other devices having appropriate processor, memory, and communications capabilities for generating, encrypting, and decrypting message data 138 as well as storing identical copies of the data repository 120. The encryption system and method 100 may query resources over the network 104 from one of the server(s) 102c and/or the user/trusted device(s) 102a, 102b directly.

The network 104 may include, for example, any one or more of a personal area network (PAN), a local area network (LAN), a campus area network (CAN), a metropolitan area network (MAN), a wide area network (WAN), a broadband network (BBN), the Internet, and the like. Further, the network 104 may include, but is not limited to, any one or more of the following network topologies, including a bus network, a star network, a ring network, a mesh network, a star-bus network, tree or hierarchical network, and the like.

The embodiment(s) detailed hereinabove may be combined in full or in part, with any alternative embodiment(s) described.

INDUSTRIAL APPLICABILITY

An example embodiment and application of the system 100, may involve one or more devices and/or servers whereby the information within the message, i.e., the message data 138, is not sent across the network 104. Instead, only pointers to where the data may be found in the pre-shared or pre-created data repository 120. Additionally, destruction or loss of the data repository 120 results in all messages being invalidated and impossible to decrypt. Thusly, access may be revoked. Decrypting the message data 138 is not possible unless the entire data repository 120 is available to the receiving device 102b.

System 100 may include the network 104 or other communication mechanism for communicating information, and a processor in one or more of the server(s)/device(s) 102. According to one aspect, the encryption system and method 100 is implemented with one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the encryption/decryption/transmission techniques. The special-purpose computing devices may be desktop computer systems, portable computer systems, handheld devices, networking devices or any other device that incorporates hard-wired and/or program logic to implement the techniques. By way of example, the system/method 100 may include one or more processor(s) such as a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

The system and/or method 100 may include and/or make use of, in addition to hardware, code that creates an execution environment for the computer program in question, e.g., code that constitutes processor firmware, a protocol stack, a database management system, an operating system, or a combination of one or more of them stored in an included memory, such as a Random Access Memory (RAM), a flash memory, a Read Only Memory (ROM), a Programmable Read-Only Memory (PROM), an Erasable PROM (EPROM), registers, a hard disk, a removable disk, a magnetic disk, an optical disk, a CD-ROM, a DVD, or any other suitable storage device, coupled to the system server(s)/device(s) 102 and the network 104 for storing information and instructions to be executed by the one or more processor(s). The processor(s) and the memory may be supplemented by, or incorporated in, special purpose logic circuitry. Expansion memory may also be provided and connected to the system 100 through one or more of the system server(s)/device(s) 102, 104—perhaps for very secure communications making use of exceptionally large data repositories 120—which may include, for example, a SIMM (Single In Line Memory Module) card interface. Such expansion memory may provide extra storage space for system 100 or may also store applications or other information. Specifically, expansion memory may include instructions to carry out or supplement the processes described above and may further store secure information. Thus, for further example, expansion memory may be provided as a security module for the system 100 and may be programmed with instructions that permit secure use of the system 100. In addition, secure applications may be provided via the SIMM cards, along with additional information, such as placing identifying information on the SIMM card in a non-hackable manner.

The instructions may be stored in memory and implemented in one or more computer program products, i.e., one or more modules of computer program instructions encoded on a computer readable medium for execution by, or to control the operation of, the system 100, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory may also be used for storing temporary variables or other intermediate information during execution of instructions.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by the communication network 104. The processes and logic flows described in this specification can be performed by one or more programmable processors executing one or more computer programs to perform functions by operating on input data and generating output.

The components of the system can be interconnected by any form or medium of digital data communication, e.g., a communication network. The communication network (e.g., network 104) may include, for example, any one or more of a PAN, a LAN, a CAN, a MAN, a WAN, a BBN, the Internet, and the like. Further, the communication network 104 may include, but is not limited to, for example, any one or more of the following network topologies, including a bus network, a star network, a ring network, a mesh network, a star-bus network, tree or hierarchical network, or the like.

For example, in certain aspects, the system 100 may be in two-way data communication via a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, server(s)/device(s) 102 send and receive electrical, electromagnetic or optical signals that carry digital data streams representing various types of information. The network link typically provides data communication through one or more networks to other data devices. For example, the network 104 may provide a connection through a local network to a host computer or to data equipment operated by an Internet Service Provider (ISP). The ISP in turn provides data communication services through the world wide packet data communication network now commonly referred to as the Internet. The local network and Internet both use electrical, electromagnetic or optical signals that carry digital data streams. The signals propagated through the various components of the network 104, which carry the digital data betwixt and between elements of the system 100, are example forms of transmission media.

In certain aspects, the system server(s)/device(s) 102 are configured to connect to a plurality of devices, such as an input devices (e.g., keyboard, illustrated in FIG. 1) and/or an output device/display (e.g., touch screen, also illustrated in FIG. 1). For example, the input device may include a stylus, a finger, a keyboard and a pointing device, e.g., a mouse or a trackball, by which a user can provide input to one or more devices 102 using the encryption system/method 100. The trusted device(s) 102 may include input devices used to provide for interaction with the user(s), such as a tactile input device, visual input device, audio input device, or brain-computer interface device. For example, input from the user can be received in any form, including acoustic, speech, tactile, or brain wave input. Example output devices include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user(s). The output devices/displays may comprise appropriate circuitry for driving the trusted device(s) 102 to present graphical and other information to the user(s) leading up to, during, or following encryption.

According to one aspect of the present disclosure, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components.

As discussed hereinabove, the system may include clients and servers. A client and server are generally remote from each other and typically interact through a communication network. The relationship of client and server arises by virtue of computer programs running on the respective computers and having a client-server relationship to each other. The system may include, for example, and without limitation, a desktop computer, laptop computer, or tablet computer. The system may also be, in whole or in part, embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processors of the system for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as might be utilized by the client(s) and/or server(s). Volatile media include dynamic memory may also be used. Transmission media include coaxial cables, copper wire, and fiber optics, including the wires that comprise portions of the network. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read/be instructed. The machine-readable storage medium can be a machine-readable storage device, a machine-readable storage substrate, a memory device, a composition of matter affecting a machine-readable propagated signal, or a combination of one or more of them.

As used in the specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

Headings and subheadings, if any, are used for convenience only and do not limit the disclosure. The word exemplary is used to mean serving as an example or illustration.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such terms are intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

Relational terms such as first and second and the like may be used to distinguish one entity or action from another without necessarily requiring or implying any actual such relationship or order between such entities or actions. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The disclosed systems and methods are well adapted to attain the ends and advantages mentioned as well as those that are inherent therein. The particular implementations disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled. Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "said" and similar references in the context of describing the disclosure (especially in the context of the following claims) are to be construed to cover both the singular and the plural, unless otherwise indicated herein or clearly contradicted by context. An element proceeded by "a," "an," "the," or "said" does not, without further constraints, preclude the existence of additional same elements. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

What is claimed is:

1. An encryption system, comprising:
   a processor programmed to execute steps comprising:
   selecting a seed for a pseudorandom number generator;
   transmitting the seed to one or more devices;
   populating a data repository based on outputs of the pseudorandom number generator in response to the seed;
   encrypting a message, comprising:
     generating a plurality of random numbers;
     indicating a starting position within the data repository by a first random number of the outputs of the pseudorandom number generator;
     expanding a polynomial expression with remaining random numbers of the outputs of the pseudorandom number generator; and,
     searching the data repository according to the starting position, the polynomial expression, and a message length until all characters of the message are identified within the data repository;
       wherein the encrypted message is defined by the starting position, the polynomial expression, and the message length; and
   transmitting the starting position, the polynomial expression, and the message length to the one or more devices; and,
   decrypting the message by searching the data repository according to the starting position, the polynomial expression, and the message length.

2. The encryption system of claim 1, wherein the one or more devices include at least one transmitting device and at least one receiving device; and further comprising the step of connecting the at least one transmitting device with the at least one receiving device over a network.

3. The encryption system of claim 2, further comprising: concatenating the starting position, the polynomial expression, and the message length into a transmission; and encrypting the transmission.

4. The encryption system of claim 3, wherein the network is an internet connection; and wherein the transmission is encrypted before being transmitted over the internet.

5. An encryption system, comprising:
   a transmitting device;
   at least one receiving device;
     wherein each device comprises at least one processor and at least one memory component;
   at least one network operatively connecting the transmitting device and the at least one receiving device; and,
   identical instances of a data repository stored on the at least one memory component of each of the devices;
     wherein the transmitting device searches for characters of the message data within the data repository stored on the transmitting device;
     wherein the transmitting device produces a starting offset position, a polynomial expression, and a message data length that together define the location of the message data within the data repository;
     wherein the transmitting device transmits the starting offset position, the polynomial expression, and the message data length to the receiving device; and,
     wherein the receiving device decrypts the message data by searching for the message data within the data repository according to a function of the starting offset position, the polynomial expression, and the message data length.

6. The encryption system of claim 5, further comprising: at least one pseudorandom number generator that produces a sequence of random numbers; and wherein the sequence of random numbers defines the starting offset position, the polynomial expression, and the message data length.

7. The encryption system of claim 6, wherein the pseudorandom number generator is initialized by a seed packet determined by the transmitting device.

8. The encryption system of claim 7, wherein the pseudorandom number generator produces the identical instances of the data repository stored on the at least one memory component of each of the devices.

9. The encryption system of claim 5, wherein the starting offset position, the polynomial expression, and the message data length, are concatenated by the transmitting device to produce a transmission.

10. The encryption system of claim 9, wherein the transmission is encrypted before the transmitting device transmits the transmission to the receiving device.

11. The encryption system of claim 5, wherein authorization to access the message data for the at least one receiving device is revoked by deleting the instance of the data repository stored on the at least one memory component of the at least one receiving device.

12. The encryption system of claim 5, wherein the message data length is divided if a first instance of the polynomial expression does not locate the message data within the data repository at all possibilities of the starting offset position.

* * * * *